(12) United States Patent
McRae et al.

(10) Patent No.: US 6,176,526 B1
(45) Date of Patent: Jan. 23, 2001

(54) EXPANSION JOINT

(75) Inventors: Fred McRae, Rydal; R. Dennis Ray, Cartersville; Constance E. Morris, Acworth, all of GA (US)

(73) Assignee: Lever Brother Company division of Conopco, New York, NY (US)

(*) Notice: Under 35 U.S.C. 154(b), the term of this patent shall be extended for 0 days.

(21) Appl. No.: 09/224,777

(22) Filed: Jan. 4, 1999

(51) Int. Cl.⁷ .................................................. F16L 3/00
(52) U.S. Cl. .......................... 285/61; 285/298; 285/302; 285/231
(58) Field of Search ............................. 285/61, 218, 302, 285/145.1, 188, 231, 374; 110/182.5; 432/99

(56) References Cited

U.S. PATENT DOCUMENTS

| | | |
|---|---|---|
| 2,807,506 | 9/1957 | Gehring . |
| 3,188,070 | 6/1965 | Lee . |
| 3,662,696 | 5/1972 | Mahr et al. . |
| 3,875,904 | 4/1975 | Astrom . |
| 3,958,819 * | 5/1976 | Tifft ..................................... 285/302 |
| 3,997,194 | 12/1976 | Eifer et al. . |
| 4,023,832 | 5/1977 | Legille et al. . |
| 4,099,798 * | 7/1978 | Steinmetz ............................. 285/302 |
| 4,160,625 * | 7/1979 | Dyhr et al. ........................... 285/302 |
| 4,290,589 * | 9/1981 | Luhrsen et al. ...................... 285/302 |
| 4,465,265 | 8/1984 | Kryczun et al. . |
| 4,807,834 * | 2/1989 | Cohen ................................... 285/302 |
| 4,865,298 | 9/1989 | Jordan . |
| 4,987,838 | 1/1991 | Mailliet et al. . |
| 5,009,455 * | 4/1991 | Irvine et al. ......................... 285/302 |
| 5,119,743 | 6/1992 | Mailliet et al. . |
| 5,209,657 * | 5/1993 | Benck et al. ....................... 110/182.5 |
| 5,227,018 | 7/1993 | Bro et al. . |
| 5,328,157 | 7/1994 | Mantey . |
| 5,462,433 | 10/1995 | Benck et al. . |
| 6,003,814 * | 12/1999 | Pke et al. ............................. 285/302 |

* cited by examiner

*Primary Examiner*—Erik K. Nicholson
(74) *Attorney, Agent, or Firm*—Rimma Mitelman

(57) ABSTRACT

This disclosure relates to an expansion joint to connect two or more concentric bodies that are heated/cooled to different temperatures for the passage of liquid or gases. When the connecting portion is at an angle not in plane with the concentric bodies, the design allows for the gravity drainage of fluids and slurries from one connecting body to another without pooling or damming.

8 Claims, 3 Drawing Sheets

EXPANSION JOINT

BACKGROUND

In various chemical processes, gases and/or liquids need to pass from one tank to another. For example, in some spray drying processes, hot air from a ring main duct is injected radically into a concentric dryer shell through equally spaced ports. In such processes, the portions connecting the tanks (concentric bodies) has been known to fail or have unacceptable performance due to expansion differences of the two bodies resulting from their dissimilar temperatures. In addition, the connecting parts, or expansion joints, are typically at an angle different from the plane of the concentric bodies to allow for the drainage of fluids or slurries from one body to another. Expansion of angled components has lead to the design of relatively complicated expansions joints.

Traditionally these expansion joints are of two types, multi-layer flexible high temperature fabric and steel meshes that flex to allow for expansion differences or a bellows style steel expansion joint. These two types of expansion joints can have unacceptable performance for a variety of reasons. For example, uneven puckering of the flexible type causes air flow imbalance between the many connecting ports, chemicals attack the fabrics which are heat resistant but not chemical resistant and the pooling or damming of fluids in the bellows prevent complete gravity draining from one body into the other body. Also, due to the need for custom shape and dimension, these types of joints can be cost prohibitive.

Therefore, there is a need for a low cost expansion joint that would allow for different expansion rates of two or more concentric bodies. There is also a need for an expansion joint between two or more concentric bodies that can completely gravity drain without pooling or damming as the bodies expand and/or contract.

SUMMARY

The present disclosure provides a connection between two or more concentric bodies having different expansion rates. The connection is particularly useful when the connection is angled with respect to the horizontal plane defined by at least one of the concentric bodies. This angled connection allows for complete gravity drainage of fluids that pass through the connection. In a most preferred embodiment, the expansion joint is a slip joint design with two tubes of different dimensions to create a minimum gap between the tube surfaces. Because expansion occurs radically between the bodies, the outer concentric body is preferably supported on lubricated skids at the same angle as the expansion joint in order to allow expansion in the same plane defined by the joint.

In a most preferred embodiment, the expansion joint is a slip joint made from two different dimensioned connecting portions with the smaller connecting portion connected to the concentric body that has the connection point higher than the connection point of the other body. This allows for gravity drainage not to be impeded due to the dimensional differences. The connecting portions preferably overlap enough to not separate when full expansion has occurred. The gap between the connecting portions can be filled with a heat resistant gasket, most preferably, with a heat resistant 'tadpole' gasket that is held in place with a backing flange.

DETAILED DESCRIPTION

Figure 1:
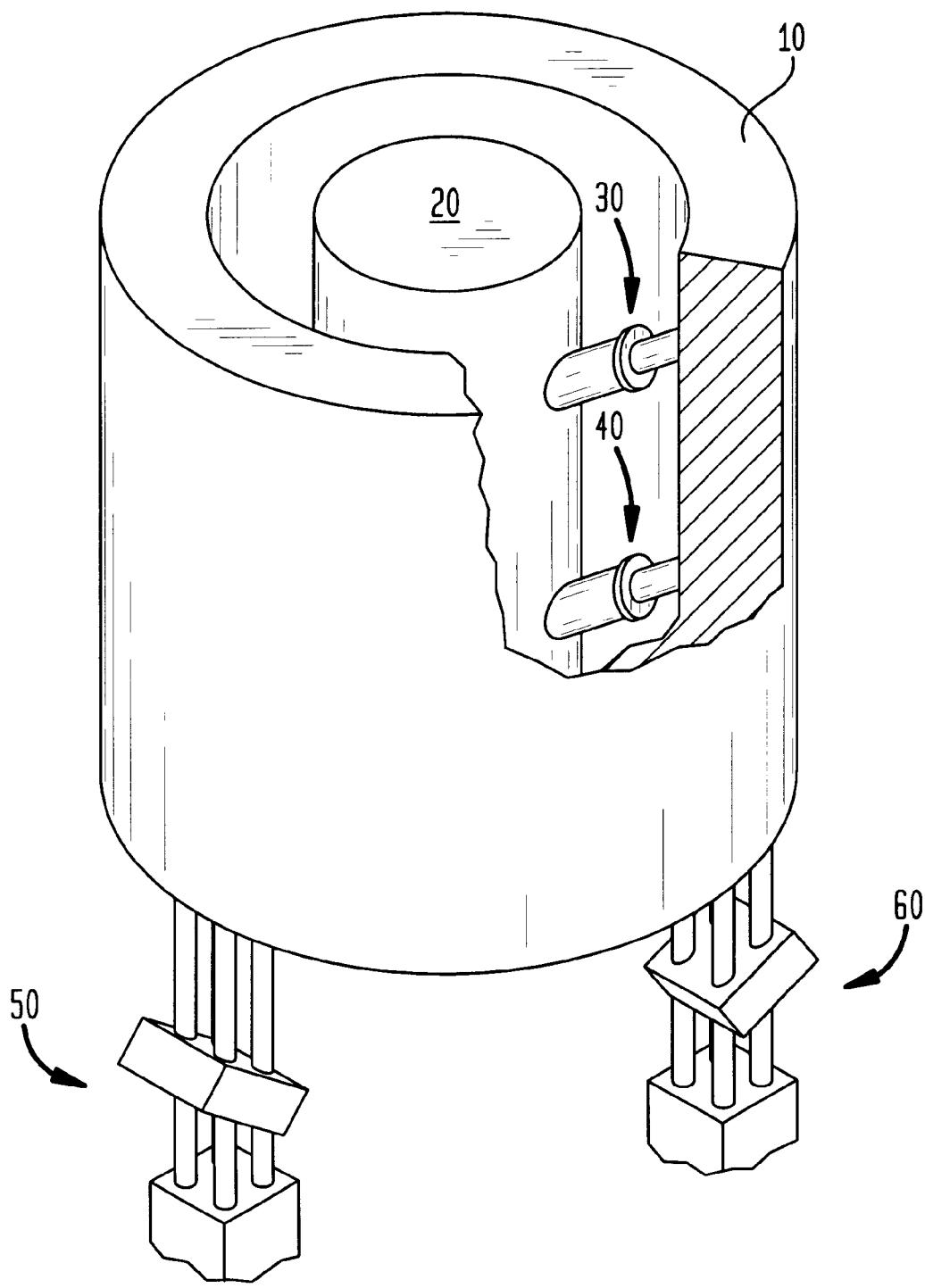
FIG. 1 is a perspective, cutaway view of two concentric bodies showing two expansion joints and two skid plates that exemplify the present disclosure.

With reference to FIG. 1, two concentric bodies 10 and 20 are connected by two sets of expansion joints 30 and 40. The number of expansion joints is unlimited and are preferably evenly distributed and symmetrically placed between the inner (20) and outer (10) concentric bodies. Also shown in FIG. 1 are two sets of support skid plates 50 and 60. The skid plates allow for free movement of outer concentric body 10 relative to inner concentric body 20. This movement is described in greater detail with respect to FIG. 2, below.

Figure 2:
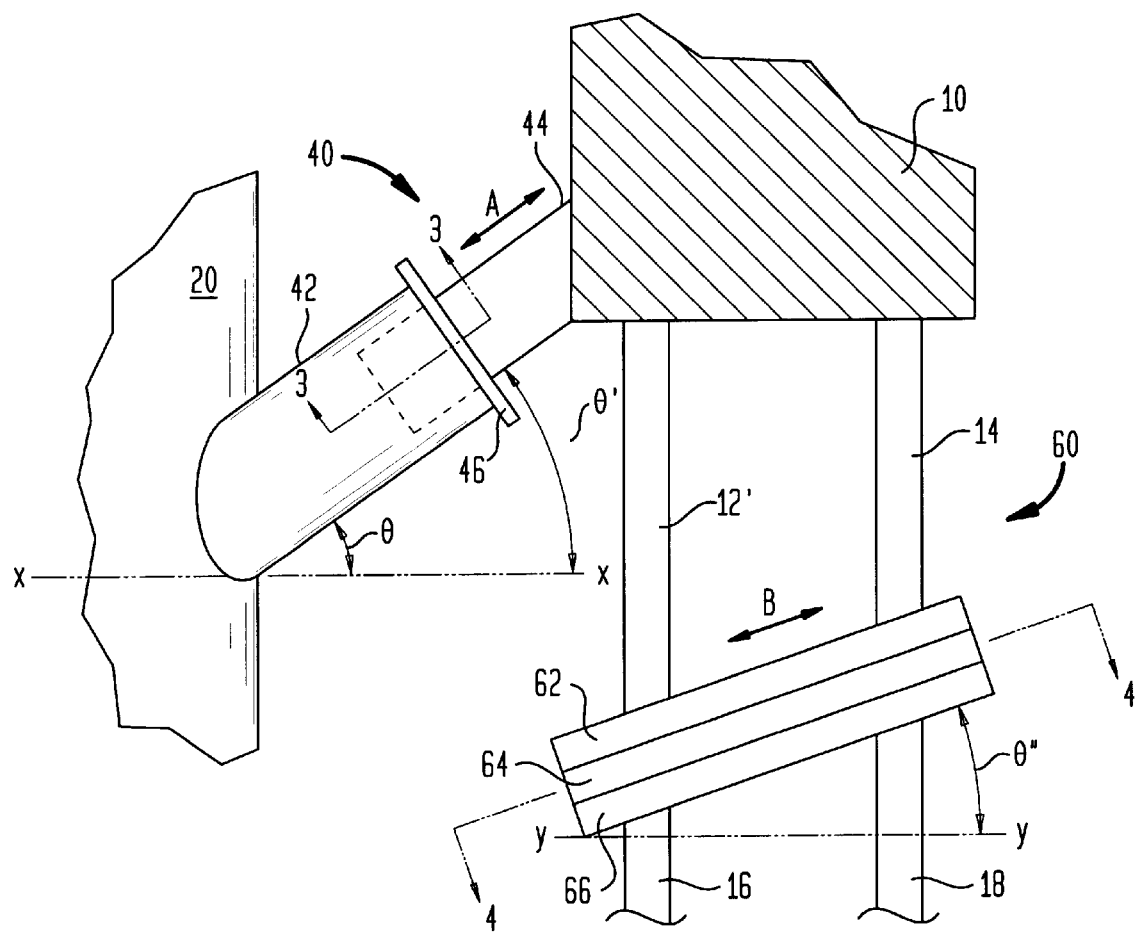
FIG. 2 is a side elevational view in partial cutaway showing the connection of two concentric bodies by a preferred expansion joint.

A side view of two concentric bodies with a preferred connecting expansion joint 40 is shown in FIG. 2. The angle $\ominus$ of the expansion joint relative to a horizontal plane connection x—x intersecting body 20 is set to allow for gravity drainage of fluids from elevated concentric body 10. As shown, $\ominus$ is preferably between 0° and 90° and most preferably between 25° and 65°. Turning to expansion joint 40, larger, outer connecting lining 42 is located and fixed to concentric body 20. Smaller, inner connecting lining 44 is fixed to body 10 and is preferably disposed at an angle $\ominus'$ relative to horizontal plane x—x, that is the same or substantially the same as $\ominus$. Again, this allows for material to drain without creating a damming or pooling effect. The outer and inner linings can be flange mounted (not shown) to the concentric bodies to allow for easy replacement or removal. The gap between linings 42 and 44 should be small enough to allow proper sealing of the gap. The outer and inner linings are preferably generally tubular and are constructed from a rigid material such as metal, polymer, plastic, ceramic or glass.

Also shown in FIG. 2 are support members 12 and 14 disposed between outer concentric body 10 and upper support shoe 62 of skid plate assembly 60. Lower shoe 66 of skid plate assembly 60 is secured to support members 16 and 18 which are preferably fixedly secured to the ground or other suitable structure. Skid plate 64 is disposed between the upper and lower support shoes.

Preferably plate assembly 60 is disposed at an angle $\ominus''$ relative to axis y—y wherein axis y—y is parallel to axis x—x passing through body 20. $\ominus''$ is preferably the same or substantially the same as $\ominus$ and $\ominus'$.

Figure 3:
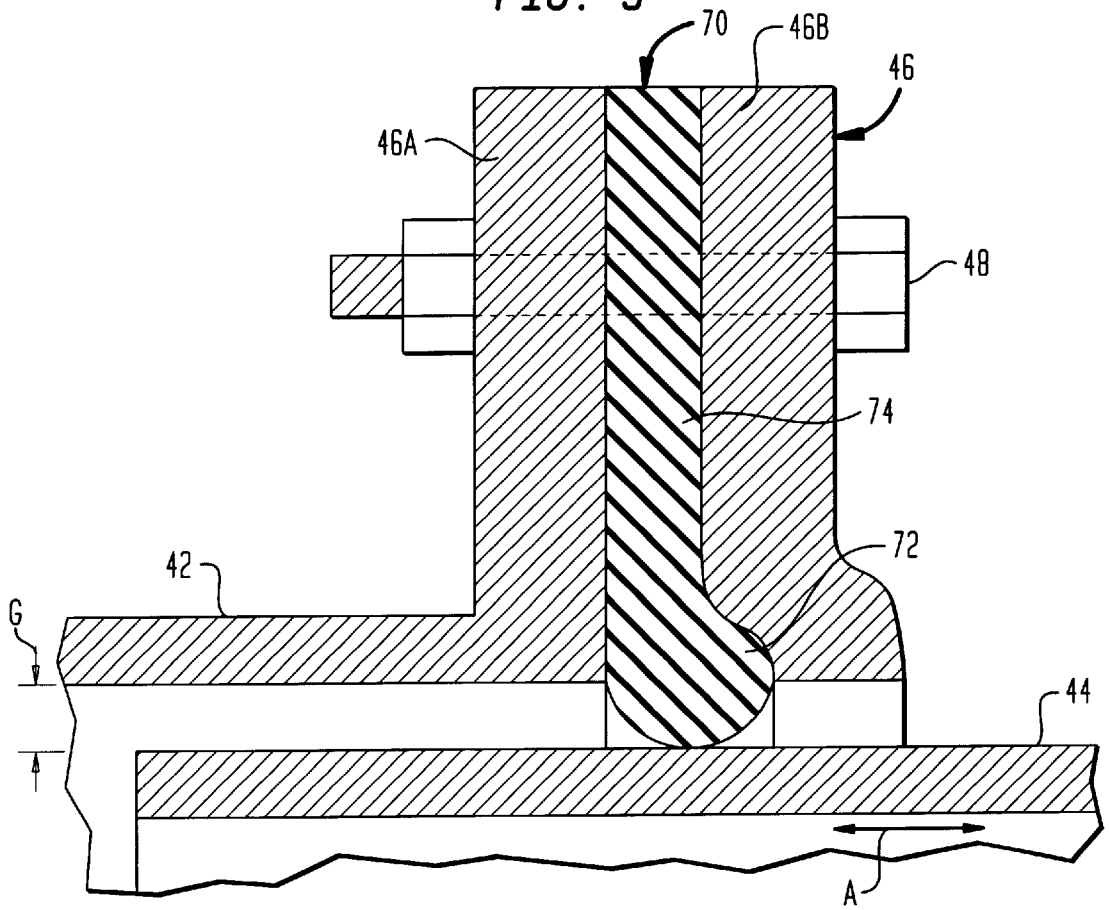
FIG. 3 is a cutaway view of a preferred system for sealing the gap between two expansion joint members.

FIG. 3 shows a gasket 70 that is suitable for sealing gap G between connecting linings 42 and 44. Gasket 70 is preferably a circular "tadpole" design fabricated from chemical resistant rubber, plastic or other suitable material. Head 72 of tadpole gasket 70 is positioned in gap G to peripherally contact the exterior of inner lining 44 to prevent or reduce the likelihood of gases, liquids, etc . . . from escaping from the system. Body 74 of gasket 70 can be secured to outer connecting lining 42 by providing gasket flange 46. Gasket flange 46 is preferably fabricated having a first flange portion 46A that is integrally formed with outer connecting lining 42 and a second backing flange portion 46B that is movable relative to first flange portion 46A. Bolt assembly 48 or other suitable compression means is used to secure gasket body 74 to flange portion 46A.

Figure 4:
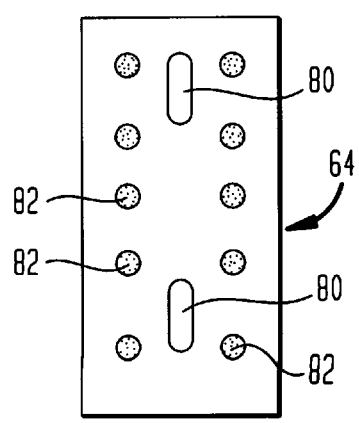
FIG. 4 is a top plan view of a preferred skid plate.

Turning to FIG. 4 and with reference to FIG. 2, skid plate 64 is attached to only one of the support shoes 62 or 66. Slots 80 are formed in skid plate 64 to allow for relative movement between skid plate 64 and either shoe 62 or 66, whichever is not attached to the skid plate. Skid plate 64 is preferably impregnated with a lubricant such as oil or graphite to allow for slippage. This can be accomplished by purchasing such a plate or by filling void spaces 82 in the plate with lubricants.

In operation, expansion/contraction of concentric body 10 relative to concentric body 20 results in a telescoping of inner connecting lining 40 relative to outer connection lining 42. Because both connecting linings and skid plate assembly 60 are generally disposed at the same angle1 the gap G between the outer surface of inner connecting lining 44 and the inner surface of outer connecting lining 42 remains generally constant during relative movement (shown by arrows A and B). By maintaining a predictable or known gap, it is possible to provide a proper seal between the two connecting members If the connecting linings were horizontal, gravity would not facilitate drainage. If the moving concentric body were not on an angled skid plate, the gap between the telescoping connecting portions would vary upon movement, potentially compromising the seal.

While various preferred embodiments are shown and described, it is understood that one skilled in the art could modify the present disclosure without departing from the scope and spirit of the invention set forth in the claims appended hereto.

What is claimed is:

1. Structure for facilitating drainage of fluid between first and second bodies comprising:
   a first body having a first connecting member disposed at a first angle relative to a plane x—x, said first connecting member having an inner dimension defining an opening;
   a second body having a second connecting member disposed at a second angle relative to plane x—x, said second connecting member having an outer dimension smaller than the inner dimension of the first connecting member;
   a fixed support member for at least partially supporting the second body; and
   a movable member disposed at a third angle relative to plane x—x, said movable member being directly or indirectly secured to the second body and being in slidable contact with the fixed support member;
   wherein said second connecting member is at least partially disposed within said first connecting member.

2. The structure according to claim 1, wherein the first and second connecting members are generally tubular in configuration.

3. The structure according to claim 1, wherein the first and second connecting members are fabricated from a rigid material selected from the group consisting of: metals; polymers; plastics; ceramics and glass.

4. The structure according to claim 1, further comprising a gasket member at least partially disposed between the first and second connecting members.

5. The structure according to claim 1, wherein movement of the second body relative to the first body causes telescoping movement of at least a portion of the second connecting within a portion of the first connecting member.

6. The structure according to claim 1, wherein the first and second bodies are concentric bodies, the first connecting member extends outwardly from the first concentric body towards the second concentric body and the second connecting member extend inwardly from the second concentric body towards the first concentric body.

7. The structure according to claim 1, wherein the second body is a spray dryer.

8. A method of delivering a fluid or gas from one vessel to another comprising:
   providing a first vessel having a first connecting member disposed at a first angle relative to a plane x—x, said first connecting member having an inner dimension defining an opening;
   providing a vessel having a second connecting member disposed at a second angle relative to plane x—x, said second connecting member having an outer dimension smaller than the inner dimension of the first connecting member, wherein said second connecting member is at least partially disposed within said first connecting member;
   providing a fixed support member for at least partially supporting the second body;
   providing a movable member disposed at a third angle relative to plane x—x, said movable member being directly or indirectly secured to the second body and being in slidable contact with the fixed support member;
   providing a liquid or gas fluid within the second vessel; and
   causing a fluid to pass through said second connecting member into said first connecting member so as to allow the fluid to pass from the second vessel to the first vessel.

\* \* \* \* \*